Patented May 14, 1929.

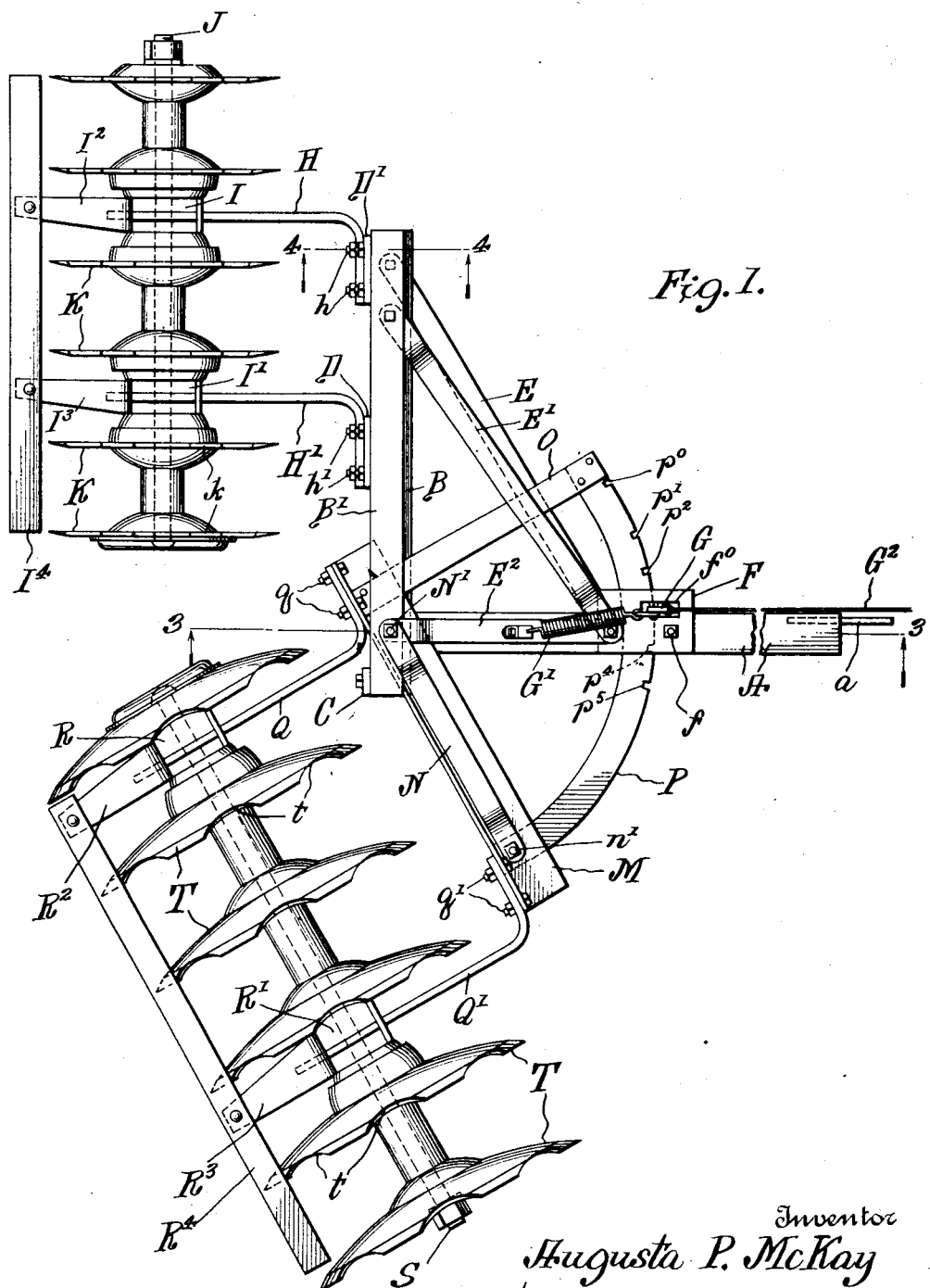

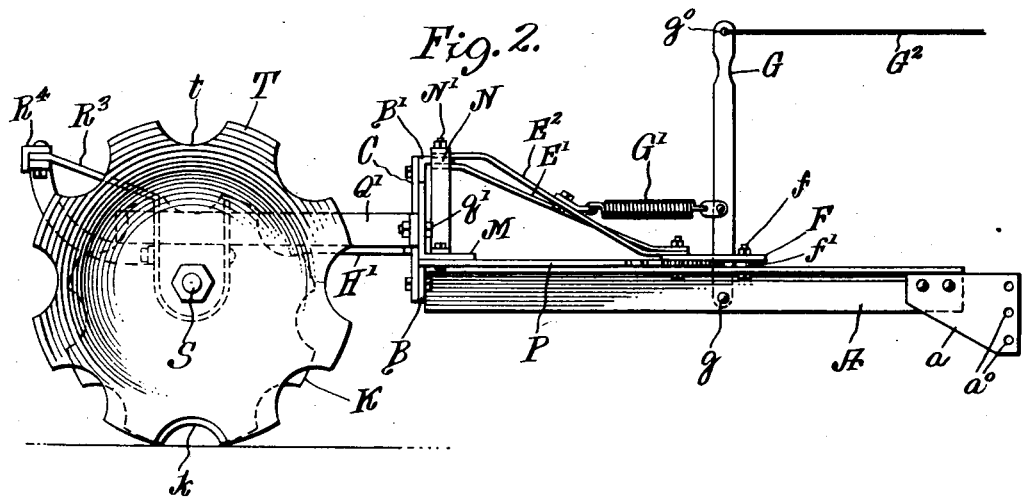
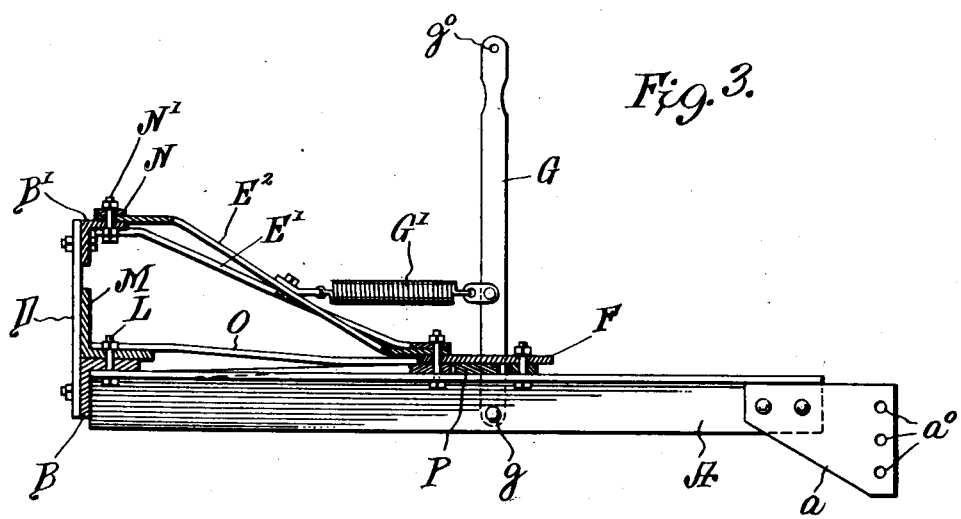
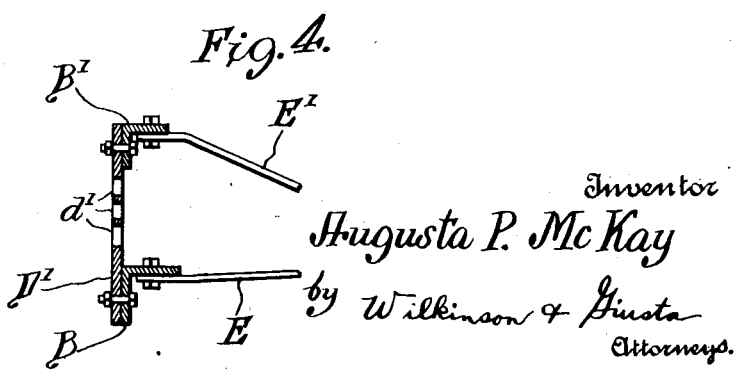

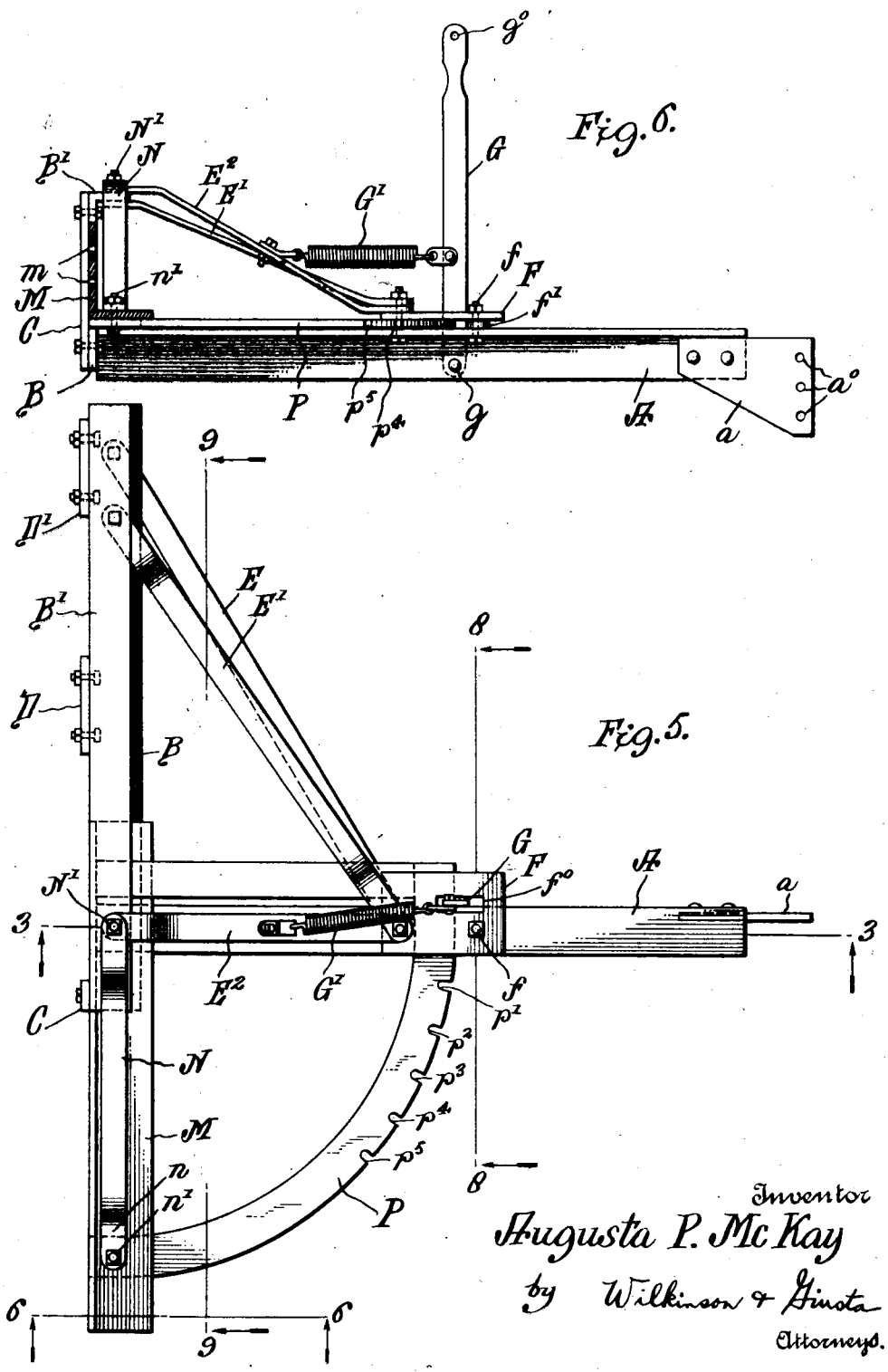

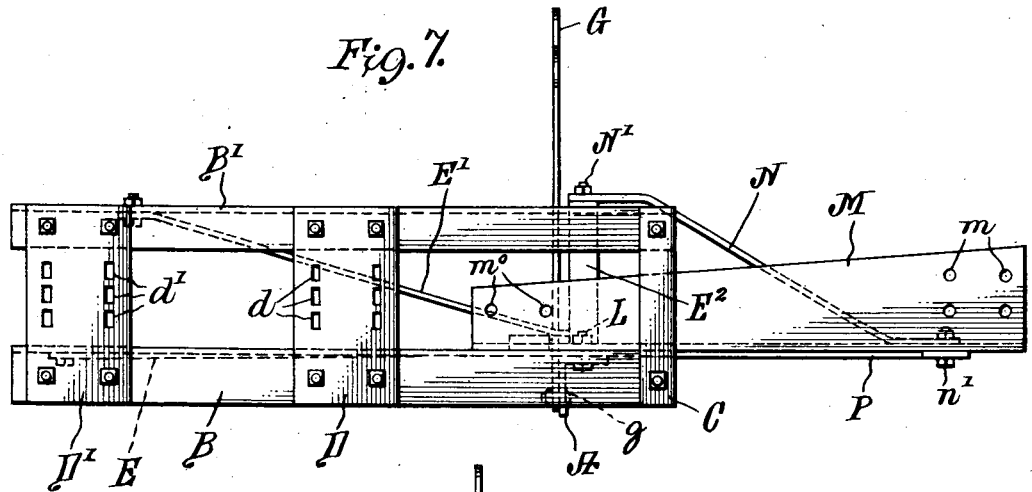
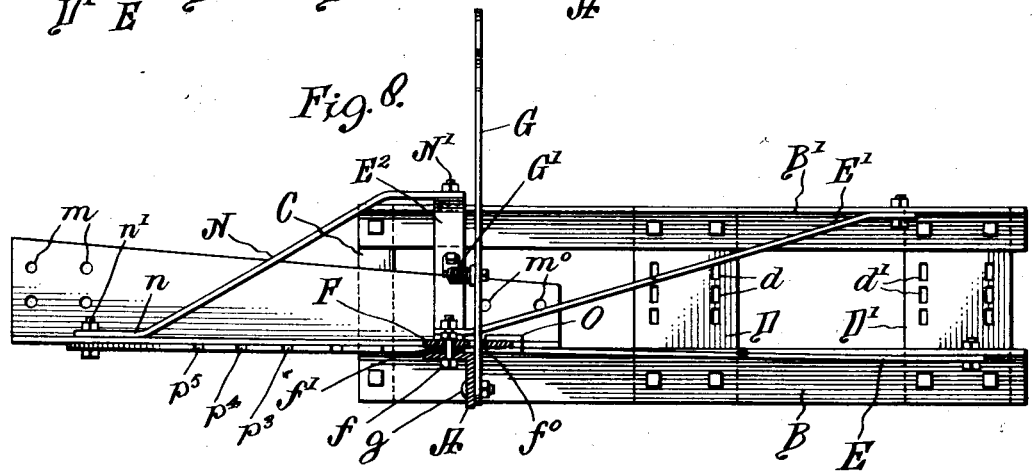
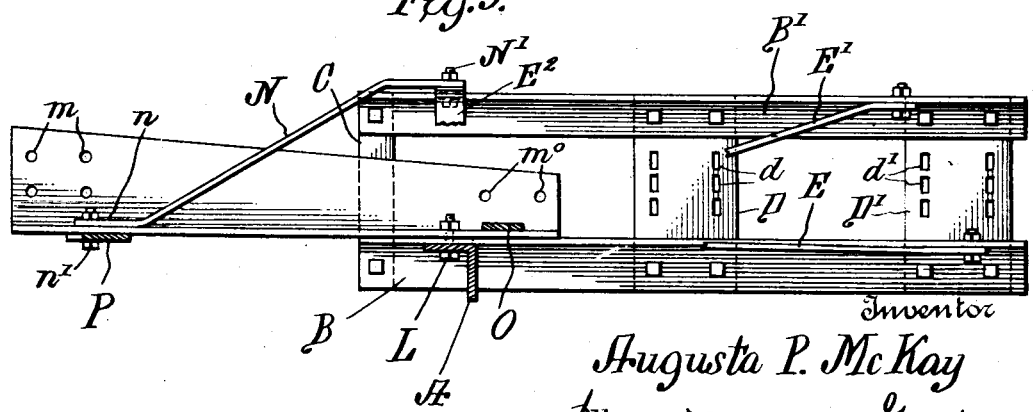

1,713,476

UNITED STATES PATENT OFFICE.

AUGUSTA POSTELLE McKAY, OF ROME, GEORGIA, ASSIGNOR TO TOWERS & SULLIVAN MANUFACTURING CO., OF ROME, GEORGIA, A CORPORATION OF GEORGIA.

ONE-WAY-PLOWING HARROW.

Application filed November 21, 1927. Serial No. 234,890.

My present invention relates to improvements in agricultural implements, and it is intended to provide a one-way plow harrow in which, by a single implement, a series of parallel cuts are made on the surface of the ground, thus to cut trash, vines, or the like and prepare the ground for subsequent plowing, and the other side of the instrument plows ground which may or may not have been previously treated.

It has long been customary for farmers to run disk harrows in advance of turning plows for the purpose of chopping the trash and scarifying the surface of the ground so as to cause the soil to pulverize more readily in the subsequent operation of plowing.

According to my present invention, the scarifying is done by a series of rotary harrows and the plowing is done at the other side of the implement by a gang of disk plows which are operated and controlled as will be hereinafter more fully described.

The invention comprises amongst other features a rigid frame attached to the draw bar which is in turn attached to the tractor, which rigid frame carries the gang of disk harrows mounted in a separate frame vertically adjustable with regard to the rigid frame, but normally fixed thereto. This gang of harrows is at one side of the implement, and at the other side pivoted in line with the draw bar is a swinging frame carrying the gang of disk plows. This disk plow frame is also vertically adjustable to the rigid frame, but is normally fixed to the swinging frame. The swinging frame carrying the plows is adapted to be swung from a position in which the axis of these plows is parallel to the axis of the harrows, at which time the plows do not act as such, but simply run along the top of the ground and scarify same. This is the position assumed when it is desired to turn the implement. On the other hand, when the swinging frame is swung making an acute angle with the draw bar, the plows are put into operation. The control of the swinging of this frame is part of the invention which will be hereinafter more fully described.

In order to prevent sagging of either of the frames, more especially of the plow frame, and to provide the uniform depth of cutting of the various harrow disks, various adjustments of the respective frames are also provided. In other words, both the harrow disks and the plow disks are arranged to enter the soil for a predetermined distance and to act as uniformly as practicable on each side of the implement so that the implement may harrow a swath of land on one side, the left side, and may plow a similar swath of land on the right.

Moreover, with disk plows of the usual construction, the soil is turned in opposite directions from the center of the gang plows, whereas with the apparatus herein described, it is turned in an outward or single direction. This is especially important in plowing on hillsides or on sloping ground.

Having set out briefly the purposes of the invention, the same will be more fully described hereinafter, and will be more particularly pointed out in the claims appended hereto.

In the drawings, wherein like symbols refer to like or corresponding parts throughout the several views, Figure 1 is a complete view of the complete apparatus as detached from the tractor, and shows the harrows in position for harrowing and the plows in position for plowing.

Figure 2 is a side view showing the plows swung back to the inoperative or non-plowing position, with their axis parallel to the axis of the harrows, the view being seen as looking from the bottom of Figure 1, but with the swinging frame swung to the rearmost position.

Figure 3 shows a sectional elevation along the line 3—3 of Figure 1, and looking in the direction of the arrows, the parts being somewhat enlarged over those shown in Figures 1 and 2.

Figure 4 shows a section along the lines 4—4 in Figure 1, looking in the direction of the arrows, the parts being shown on the same enlarged scale as in Figure 3.

Figure 5 is a plan view of the main frame and the swinging frame with the frames carrying the harrows and plows detached therefrom, and shows the swinging frame swung to the rearward position, in which position the plows do not operate as such.

Figure 6 shows a section along the lines 6—6 of Figure 5 and looking in the direction of the arrows.

Figure 7 is a rear view of the main frame and the swinging frame with the plow and harrow frames detached and illustrating the vertical adjustability of the plow and harrow frames.

Figure 8 is a sectional elevation of the main and swinging frames along the line 8—8 of Figure 5, and looking in the direction of the arrows, and Figure 9 is a similar view of Figure 8, but shows a variation along the line 9—9 looking in the direction of the arrows.

Figures 1 and 2 are on a smaller scale than are the remaining figures, and Figures 3 to 9 are substantially of the same scale.

Figure 1 shows in plan the main frame to which the draw bar and the swinging frame carrying the harrows are rigidly attached, the whole forming one rigid frame. To this rigid frame a swinging frame is pivoted, which swinging frame comprises a trussed construction carrying a notched sector which trussed frame swings about the main frame and to which trussed frame the plow frame is rigidly attached. Thus there are in effect two frames pivoted together, the rigid frame comprising the draw bar and the harrow frame and the swinging frame comprising the trussed frame including the sector and the plow frame, the two being pivoted to the main frame.

A represents the draw bar provided at its forward end with the hitch plate $a$ having holes $a^0$, to any one of which the tractor coupling, not shown, is attached. This hitch plate is preferably made in the form of a triangle, as shown, and the draw bar is in the form of an angle iron. To the rear end of the draw bar the beam B in the form of an angle iron is attached, which beam B constitutes the lower member of the trussed frame to which the harrow frame is attached. The upper beam B' of this frame is connected to the lower beam B by the stop plate C and the two plates D and D', which latter plates are perforated with holes $d$ and $d'$ which will permit of the adjusting position of the harrow frame, vertically.

From the lower beam B the brace E connects the same with the draw bar and the similar brace E' connects the upper beam B' with the draw bar, the draw bar being preferably provided with the plate F spaced away therefrom to which the ends of these braces are attached and beneath which plate the sector swings as will be hereinafter described. This plate F is secured to the draw bar by means of the bolts $f$, shown in Figure 3, and is spaced away from the draw bar by the washers $f'$, as shown in the said figure. The said plate is also provided with the slot $f^0$ to permit the passage therethrough of the plow control lever G pivoted to the draw bar as at $g$ and normally held in position by the spring G', (see Figure 2). This lever is provided near its upper end with the hole $g^0$ for the tripping line $G^2$.

Rigidly attached to the fixed frame just described is the harrow frame, which comprises the two bent arms H and H' having their forward ends secured by the bolts $h$ and $h'$, see Figure 1, which engage the appropriate perforations $d$ and $d'$ of the plates D and D'. When it is desired to have the harrows cut deep, these bolts are placed in the lower perforations, and when it is desired to have the harrows make a shallow cut, the bolts may be placed in the upper perforations, but after being once secured in the perforations, the harrow frame forms a rigid structure with the main frame.

These arms H and H' carry journal boxes I and I', in which is journalled the axle J carrying the harrow disks K. These harrow disks are preferably dentated as at $k$ and sharpened, as shown in Figures 1 and 2.

The journal boxes I and I' have rearwardly projecting arms $I^2$ and $I^3$ which are connected at their outer ends by the brace $I^4$, thus completing the harrow frame and serving also as a guard or fender for the rear ends of the harrow disks. The axle J is always at right angles to the vertical plane passing through the draw bar, so that the harrow disks will cut grooves parallel to the direction of the line of draft. Pivoted to the main frame, just described, is the swinging frame, which comprises the angle beam M pivoted to the main frame by the bolt L, see Figure 3. This beam M is preferably tapered as shown in Figures 8 and 9, and is provided at its outer or deeper end with perforations $m$ to which the securing bolts of the plow frame are attached.

There may be two or more tiers of these perforations, so that the plow frame may be vertically adjustable to the swinging frame, thus in this way correcting the sagging tendency of the swing frame as will be described hereinafter.

The inner end of the swinging beam M is provided with perforations $m^0$ to which the securing bolts of the plow frame are attached, as will be hereinafter explained.

The swinging beam M is held against either tilting up or sagging down by means of the brace N secured at its lower end $n$ to the swinging beam M, and at its upper end pivoted to the main frame by the bolt N'. Attached to the swinging beam M near the pivot L is a strut O, projecting forward and forming a support for one end of the sector P, the other end of the sector P being connected to the beam M as by the bolt $n'$. This sector P is provided with a series of notches $p^0$—$p^5$, as shown most clearly in Figure 1, into which notches the latch lever G is snapped by the spring G' and thus the sector is held at the desired position relative to the draw bar. This sector rides on top of the draw bar and beneath the plate F.

The rear end of the spring G' is connected to the brace $E^2$ which connects the plate F to the beam B', as shown in Figure 3.

Attached to the swinging frame, just mentioned, is the plow frame which comprises the two bent arms Q and Q' bolted at their forward ends to the beam M and carrying at their rear ends journal bearings R and R', and the shaft S carrying the plow disks T. These disks are preferably dentated as at $t$, see Figures 1 and 2. The journal bearings R have rearwardly projecting arms $R^2$ and $R^3$ to which the rail $R^4$ is secured. This completes the plow frame and serves also as a rear guard or buffer for the plow disk when the implement is backed.

In attaching the arms Q and Q' to the swinging beam M, the bolts $q$ of the arm Q pass through the bolt holes $m^0$ of the beam M, see Figures 8 and 9, while the bolts $q'$ pass through the arm Q' and are secured in one or the other of the sets of perforations $m$ of the beam M, as shown in Figures 8 and 9.

In practice, it has been found that the outer end of this swinging beam M will tend to sag when the plow is in operation, and, therefore, it may be preferable to insert the bolts $q'$ in the upper tier of the holes $m$.

The operation of the device is as follows:

When the implement is not used as a combined plow and harrow, as in turning, and at other times when the plow is not in operation, the latch lever is drawn forward against the action of the spring and the forward movement of the tractor will cause the plows to rock the swinging frame about the pivot until the rear face of the beam M hits the stop plate C, and then the beam M and the beams B and B' will be in alinement, as shown in Figures 2 and 5. At this time, as the implement is drawn forward, both the plows and the harrows will cut parallel grooves in the ground, but there will be no plowing effected.

Now if it is desired to set the implement for both plowing and scarifying the soil, back the tractor slightly and pull forward on the latch lever and the plows will cause the swinging frame to swing about the pivot L. When the plow frame has swung to the desired angle, as shown in Figure 1, release the tripping line G' and the latch lever will snap into engagement with one of the grooves in the sector P, thus locking the frame against a swinging movement in either direction.

If it be desired to plow a wide swath, the swinging frame is stopped before it is swung forward through a large angle; whereas if it is desired to plow a narrow swath, the swinging frame may be allowed to swing to a large angle, so that the width of the swath plowed may be regulated as desired, and obviously, the depth of plowing may be provided for by the adjusting of the frames as referred to.

In operation, the harrows will cut a series of parallel grooves through trash, vines, or the like covering the ground, and will thus facilitate the subsequent plowing operation of that strip of land, whereas the plows will plow up the land that has been scarified by the harrows just referred to.

By adjusting the harrow frame, deeper or shallower cuts may be made by the harrows, and also, incidentally by the plows, since the height of the main frame carrying the harrows will regulate the height of the swinging frame carrying the plows. It will be noted that the harrows cutting into the ground parallel to the line of draft will hold the implement against the lateral thrust which will be occasioned by the plows working on one side of the machine at an angle, as illustrated, for instance, in Figure 1. This will take care of any tendency of the implement to push over bodily in a lateral direction.

While I have shown six harrow disks and six plow disks mounted on their respective frames, it will be obvious that these may be increased or decreased depending upon the use of the implement, the land on which it is desired to be used, and the power of the tractor by which it is to be drawn.

By the herein described construction, any tendency of the end of the plow frame to sag down, may be compensated for and the plows will all dig into level ground to substantially the same depth. It will be also noted that the earth will be turned over by the plows always in the same direction, which is a desirable feature in plowing around hillsides or on sloping land.

While I have described one embodiment of the invention in its preferred form, it will be obvious that various changes might be made in the construction, combination and arrangement of parts which might be used without departing from the spirit of my invention, and I do not intend to limit the invention to such details except as pointed out in the claims.

Having thus described my invention, what I claim and desire to secure by Letters Patent of the United States is:—

1. An agricultural implement adapted to be drawn by a tractor, and comprising a main frame provided with a draw bar, a harrow frame secured to said main frame, a shaft journalled in said harrow frame at right angles to said draw bar, a series of harrow disks mounted on said shaft, a swinging frame pivoted to said main frame, and provided with a notched sector plate, a spring impressed lever pivoted to said main frame and adapted to engage in one of the notches of said sector plate for holding said swinging frame at the desired angle relative to said main frame, means operable from said tractor for releasing said lever from engagement, a plow frame secured to said swinging frame, a shaft journalled transversely in said plow frame, and a series of plow disks secured on said last mentioned shaft.

2. An agricultural implement adapted to be drawn by a tractor, and comprising a main frame provided with a draw bar, a harrow frame secured to said main frame, a shaft journalled in said harrow frame at right angles to the line of draft, a series of harrow disks mounted on said shaft, a swinging frame pivoted to said main frame, and provided with a notched sector plate, a spring impressed lever pivoted to said main frame and adapted to engage in one of the notches of said sector plate for holding said swinging frame at the desired angle relative to said main frame, a tripping line attached to said lever, and operable from said tractor for releasing said lever from engagement with its notch, a plow frame secured to said swinging frame, a shaft journalled transversely in said plow frame, and a series of plow disks secured on said last mentioned shaft.

3. An agricultural implement comprising a main frame provided with a draw bar, a harrow frame secured to said main frame, a shaft journalled in said harrow frame substantially at right angles to said draw bar, a series of harrow disks mounted on said shaft, a swinging frame pivoted to said main frame, and provided with a notched sector plate, a lever pivoted to said main frame and adapted to engage in one of the notches of said sector plate for holding said swinging frame at the desired angle relative to said main frame, a plow frame secured to said swinging frame, a shaft journalled transversely in said plow frame, and a series of plow disks secured on said last mentioned shaft.

4. An agricultural implement comprising a main frame provided with a draw bar, a harrow frame secured to said main frame, a shaft journalled in said harrow frame substantially at right angles to said draw bar, a series of harrow disks mounted on said shaft, a swinging frame pivoted to said main frame, and provided with a notched sector plate, a spring impressed lever pivoted to said main frame and adapted to automatically engage in one of the notches of said sector plate for holding said swinging frame at the desired angle relative to said main frame, a plow frame secured to said swinging frame, a shaft journalled transversely in said plow frame, and a series of plow disks secured on said last mentioned shaft.

5. An agricultural implement comprising a main frame provided with a draw bar, a harrow frame secured to said main frame, a shaft journalled in said harrow frame substantially at right angles to said draw bar, a series of harrow disks mounted on said shaft, a swinging frame pivoted to said main frame, and provided with a notched sector plate, a spring impressed lever pivoted to said main frame and adapted to automatically engage in one of the notches of said sector plate for holding said swinging frame at the desired angle relative to said main frame, means for releasing said lever from engagement, a plow frame secured to said swinging frame, means for adjusting vertically the outer end of the plow frame to prevent sagging, a shaft journalled transversely in said plow frame, and a series of plow disks secured on said last mentioned shaft.

6. An agricultural implement adapted to be drawn by a tractor, and comprising a main frame provided with a draw bar, a harrow frame secured to said main frame, a shaft journalled in said harrow frame substantially at right angles to the line of draft, a series of harrow disks mounted on said shaft, a swinging frame pivoted to said main frame, and provided with a notched sector plate, a spring impressed lever pivoted to said main frame and adapted to automatically engage in one of the notches of said sector plate for holding said swinging frame at the desired angle relative to said main frame, a tripping line attached to said lever, and operable from said tractor for releasing said lever from engagement with its notch, a plow frame secured to said swinging frame, means for vertically adjusting said plow frame relative to said swinging frame, a shaft journalled transversely in said plow frame, and a series of plow disks secured on said last mentioned shaft.

7. An agricultural implement adapted to be drawn by a tractor, and comprising a main frame provided with a draw bar, a harrow frame secured to said main frame, a shaft journalled in said harrow frame substantially at right angles to the line of draft, a series of harrow disks mounted on said shaft, a swinging frame pivoted to said main frame, and provided with a notched sector plate, a spring impressed lever pivoted to said main frame and adapted to engage in one of the notches of said sector plate for holding said swinging frame at the desired angle relative to said main frame, means operable from said tractor for releasing said lever from engagement with its notch, a plow frame secured to said swinging frame, means for vertically adjusting said plow frame relative to said swinging frame, a shaft journalled transversely in said plow frame, and a series of plow disks secured on said last mentioned shaft.

AUGUSTA POSTELLE McKAY.